United States Patent [19]
Korn et al.

[11] 3,895,465
[45] July 22, 1975

[54] CLEANING CONTAMINATED SURFACES OF NUCLEAR POWER PLANTS AND RECOVERY OF REMOVED SURFACE PARTICLES

[75] Inventors: Roland Korn, Nurnberg; Günter Seyd; Uwe Paulsen, both of Erlangen, all of Germany

[73] Assignee: Siemens Aktiengesellschaft, Munich, Germany

[22] Filed: Dec. 3, 1973

[21] Appl. No.: 420,794

[30] Foreign Application Priority Data
Dec. 4, 1972  Germany............................ 2259334

[52] U.S. Cl. ................................................. 51/320
[51] Int. Cl. .............................................. B24c 1/00
[58] Field of Search ............................. 51/319–321, 51/290, 292, 8 R, 325

[56] References Cited
UNITED STATES PATENTS

| | | | |
|---|---|---|---|
| 2,462,480 | 2/1949 | Eppler................................... | 51/8 R |
| 2,653,420 | 9/1953 | Ruth...................................... | 51/8 R |
| 2,665,118 | 1/1954 | Broman............................ | 51/8 R UX |
| 3,237,351 | 3/1966 | Millhiser................................ | 51/320 |
| 3,299,459 | 1/1967 | McCune.............................. | 51/8 R X |
| 3,455,062 | 7/1969 | Eppler.................................... | 51/8 R |
| 3,778,938 | 12/1973 | Korn...................................... | 51/320 |

*Primary Examiner*—Donald G. Kelly
*Attorney, Agent, or Firm*—Herbert L. Lerner

[57] ABSTRACT

Radio-actively contaminated surfaces are cleaned by blasting the surface with particles of boron trioxide propelled through a jet with compressed gas. As a result of the abrading action, the boron trioxide becomes contaminated with abraded, radio-active solid particles. The abraded solid particles are separated from the boron trioxide by admixing water to dissolve the boron trioxide and then filtering the boron trioxide aqueous solution containing abraded solid particles to separate and recover the abraded solid particles in the boron trioxide solution. The boron trioxide aqueous solution may be treated to recover boron trioxide particles. The separated radio-active particles may be sent to a treating plant for concentration and recovery of radio-active values.

7 Claims, 1 Drawing Figure

PATENTED JUL 22 1975 3,895,465
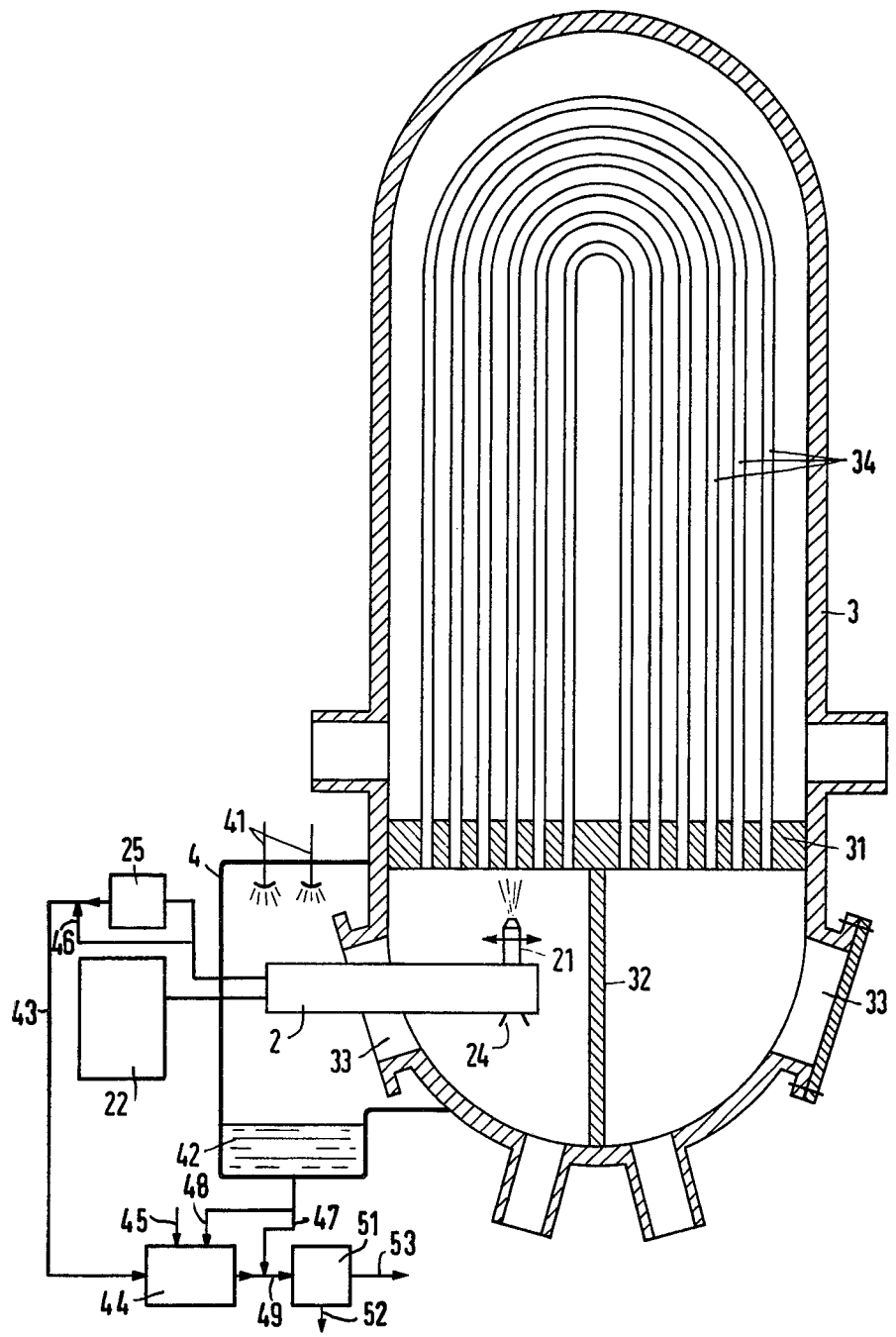

CLEANING CONTAMINATED SURFACES OF NUCLEAR POWER PLANTS AND RECOVERY OF REMOVED SURFACE PARTICLES

In our copending application, Ser. No. 223,471 filed Feb. 4, 1972, now U.S. Pat. No. 3,778,938, issued Dec. 18, 1973, we disclose a method for cleaning of components of nuclear reactor power plants which have been wetted during the operation with $H_2O$ or, as the case may be, with $D_2O$, particularly for the decontamination of radio-actively contaminated regions.

The present invention relates to and is an improvement on the method of cleaning particles from nuclear reactor plant surfaces as described in application Ser. No. 223,471 involving decontamination of radio-actively contaminated regions by boron trioxide particles propelled against the surface through a jet by compressed gas, and is particularly directed to separation and recovery of boron trioxide contaminated with radio-active particles abraded from the surface of the contaminated region.

It is accordingly an object of the invention to provide a method for removing the contaminants from the surface of a nuclear reactor component with boron trioxide and separating the boron trioxide contaminated with abraded radio-active particles to produce boron trioxide suitable for reuse.

With the foregoing and other objects in view, there is provided, in a process for cleaning of components of nuclear reactor power plants which have been wetted during the operation with $H_2O$ or $D_2O$, particularly for the decontamination of radio-actively contaminated regions, by mechanically abrading the surfaces to be cleaned down to the passivation layer of the base material by means of boron trioxide particles with the aid of compressed gas, the improvement which comprises admixing water with the abraded solid particles and boron trioxide particles to dissolve the boron trioxide particles, and filtering the boron trioxide aqueous solution containing abraded solid particles to separate and recover the abraded solid particles and the boron trioxide solution.

Nuclear reactor power plants which have been wetted during the operation with $H_2O$ or, as the case may be, with $D_2O$, periodically require decontamination of radio-actively contaminated regions. The primary circulation apparatus of water-cooled nuclear reactors, and also those that are cooled with heavy water, outside of the actual reactor container proper, are composed of pipe conduits, steam generators, condensers, pumps and similar installations, which are normally made of steel. It is unavoidable that, in such a plant, in the course of time, a sediment is deposited on the inner walls of these components, which may be composed of radioactive and inactive corrosion products of the component materials, as well as of radio-active fission products derived from defective fuel elements. The radio-activity of these layers may, in the course of time, become so large that, whenever repairs become necessary, work in their vicinity is only possible over a short period or not at all, due to radiation. Thus, normally a longer operating interruption of the nuclear reactor must be provided for, until the radio-activity of the components which are to be repaired, for instance, a pump or a steam generator, has decayed to such an extent that endangerment of the working personnel is no longer present.

Such long periods of interruption, however, are completely intolerable for the economic operation of a nuclear power plant. The usual decontamination techniques with the aid of acids and pickles, however, are impossible in connection with fixedly builtin power plant components, since the possible transport of such treatment media into other portions of the plant may lead to further inestimable damage. The task arose, therefore, with conscious departure from such known methods and techniques, to find a decontamination method which may be put in operation, immediately following the shut-down of the power plant, and thereby permitting the carrying through of the necessary repairs, as well as the start-up of the plant in the shortest possible time. It also becomes necessary to avoid with absolute certainty any injurious effects of such methods on other nuclear reactor components. The method further called also for such a safety factor that, in the case of any faulty operation, absolute certainty was provided that damage to the base material and to the surface of the components to be cleaned, could not take place.

Boron trioxide particles with the aid of a compressed jet are used for the mechanical working off of the surfaces to be cleaned down to the passivation layer of the base material. The remainder of the jet blast material is dissolved and then removed by water flush. This represents a modified sand blasting technique wherein, instead of the quartz with a Mohs hardness of 7, boron trioxide ($B_2O_3$) is used with a Mohs hardness of 5 to 6. This material, accordingly, is considerably softer than quartz, and its hardness is of the order of magnitude corresponding to that of the deposits on the components which are to be removed, which essentially are comprised of coherent layers of magnetite-like character. Thus, the first oxidation layer on the base material, due to the absence of other foreign matter deposits, is substantially harder than the overlying layers. This basic layer has the task to protect the base material from further corrosion, and is defined herewith also as a passivation layer. Injury to this layer due to decontamination would, therefore, expose the base material to a further corrosion attack, which if possible, should be prevented. Since the jet blast material used, that is, boron trioxide, is somewhat softer than this passivation layer, this process thus does not result in any further attack thereon. Independent of the period of treatment and the speed of the boron trioxide particles, this passivation layer therefore remains preserved so that an inherent safety is contained in this treatment process. The boron trioxide, furthermore, has the great advantage that it is easily water-soluble, so that, by means of flushing, it may be recovered comparatively easily from the cleaned components. Should, however, after the flushing process or after the subsequent repairs, boron trioxide particles still remain in the installation, this does not represent, however, any disadvantage, since these particles may be dissolved through the reactor cooling media, whereby they are converted into boric acid. Just, boric acid, however, is used in water-cooled nuclear reactors as dissolved neutron poison in the cooling water for compensation of the surplus reactivity, so that boric acid components, additionally derived from the cleaning process, may be further used through the boric acid control system of the reactor, without difficulty.

Although the boron trioxide sand, which comes in various grain sizes, may be considered hygroscopic, the life, however, of containers with this blasting material, which have been opened, will definitely last through several days without precautions. For the purpose of handling this material, therefore, no special hygroscopic protection is necessary, so that the carrying out of the process then becomes relatively uncomplicated.

Apart from these advantages, the method in accordance with the invention, vis-a-vis the known acid-pickling processes, has the further great advantage that it may be used with far greater target precision. That is to say, predetermined surface portions, including those of small dimensions of only a few square centimeters, as well as all of the surfaces of nuclear reactor components, may be decontaminated.

In accordance with the invention, the dust-like mixture containing boron trioxide particles and abraded solid particles from the treatment region are mixed with water to dissolve the boron trioxide particles and the aqueous solution of boron trioxide containing abraded solid particles is filtered to separate and recover the boron trioxide solution from the abraded solid particles.

Solution of the boron trioxide in the water may be facilitated by introduction of gas into the mixture to agitate the mixture to provide improved contact between the water and the solid particles. Water may be added to the atmosphere around the area of decontamination to precipitate abraded solid particles and borontrioxide. This latter mixture may also be added to the dust-like mixture and treated in the same manner, i.e. sufficient water is mixed therewith to dissolve the boron trioxide, and the contaminated materials then separated by filtration from the aqueous solution of boron trioxide. Similarly, water added to flush borontrioxide particles from the decontamination region may be mingled with above previous mixture.

The boron trioxide $B_2O_3$ reacts with water to form $H_3BO_3$ (boric acid) which is readily soluble in water and is used for trimming nuclear reactors, more particularly pressurized water reactors. The separation of the abraded solid particles from the aqueous solution of borontrioxide may be effected by suitable known filters such as magnetic, mechanical and ion exchangers. As in other filtering processes, the employed filters must be exchanged and cleaned periodically. In some instances when using paper filters or synthetic filter media, it is unnecessary to remove the filter cake, i.e. the radio-active particles attached to the filter medium, and the filter medium containing the filter cake may be sent directly to the concentration plant which is normally present in each nuclear reactor plant.

Preferably the mixture of aqueous solution of boron trioxide and abraded solid particles are sent through a filter media having different mesh sizes. In this manner the abraded solid particles are divided into various fractions of mesh sizes, which fractions will vary not only with respect to their mesh size but also with respect to their radio-activity. This may simplify subsequent treatment of the separated abraded radio-active particles. The boric acid solution which remains after the filtering process can either be used for the trimming of nuclear reactors or may be subsequently treated to produce additional boron trioxide particles.

The construction and method of operation of the invention, however, together with additional objects and advantages thereof, will be best understood from the following description of specific embodiments when read in connection with the accompanying drawing.

For a further explanation of this process, reference is made to the figure in which an exemplified case has been shown schematically. In the case shown, the cleaning of the pipe sheet of a steam generator in a nuclear power plant has been exemplified. This cleaning is necessary since, for instance, one or more heat exchanger pipes 34 have become leaky. It is therefore necessary to lock them into a pipe sheet 31, which, however, is only possible after a decontamination of its surface. The blast arrangement 2 is accordingly introduced through a manhole 33 of a chamber of the boiler 3. The jet nozzle 21 is here led back and forth in accordance with a coordinate guiding system along the surface of the pipe sheet 31, the compressed gas being supplied in a known manner, for instance, from a compressor 22. The storage container for the boron trioxide sand is, for the purposes of clarity, not further illustrated. The grain size of the blast material, for example, may comprise 150 $\mu$, and the gas pressure 6 atmospheres. Within 1 minute, approximately 500 g are blasted out and thereby a surface of about 100 to 200 $cm^2$ will have been cleaned. The removal of the main body of the blasted boron trioxide takes place through suction and filling into barrels, appropriate filters being provided for the protection of the surroundings. After carrying through the decontamination, water is flushed over the treated surface and thereby remainders of the boron trioxide thereon are dissolved out. In connection therewith, it is of advantage, during the blasting process, to protect the adjacent surroundings of the heat exchangers to be treated, from the boron trioxide dust, and also against radioactive impurities contained therein. This may be obtained by means of screening 4, for instance of plastic foil, it of course being understood that the compressed air introduced into the steam generator will again have to be removed through an exhaust aperture 24. The compressed air is then exhausted into the open through a filter 25, which retains the entrained boron trioxide particles.

The dust trapped on filter 25 is a mixture of boron trioxide particles and abraded solid particles. This dust is transferred via line 43 into dissolving tank 44 wherein water is introduced through line 45 in an amount at least sufficient to dissolve all the boron trioxide dust particles. To facilitate dissolution of the boron trioxide in the water in tank 44, a portion of the gas entering filter 25 is diverted through line 46 and then passes through line 43 into tank 44 where it agitates and helps dissolve the boron trioxide.

It may be further advantageous to effect, within this working space, by means of fogging nozzle 41, a strong humidification of the room atmosphere and to thereby precipitate the boron trioxide dust particles, as well as particles of the abraded layers and to collect them in a container 42. Water may be used to flush boron trioxide particles from the decontamination region and this spent water may be sent to container 42. A mixture of solid abraded particles, boron trioxide and water collected in container 42 may be sent through lines 47 and 48 into water dissolution tank 44. If there is sufficient water in container 42 to dissolve all the boron trioxide, then tank 44 may be bypassed and the solution may be sent directly through line 47 and line 49 into filter 51. Aqueous solution of boron trioxide and suspended particles of abraded solid material pass through line 49 into filter 51 wherein the abraded particles are separated and discharged through line 52 and the aqueous solution of boron trioxide free of contamination by radio active solid particles is discharged through line 53 for further use.

When such a decontamination has been carried out manually, that is, when the operating personnel is present within the range of the boron trioxide dust, it is appropriate to wear a protective respirator mask, as well as appropriate protective goggles for the eyes, so as to prevent boric acid injury thereto. These, however, are utensils which are also required to be used during normal sand blasting operations.

Normally, for the blast installation, the use of a nozzle is sufficient, such as is known from sandblasting technology. If, however, especially small surfaces are to be decontaminated, as specific targets, for instance, unfavorably situated surface forms have to be reached, it is appropriately useful to throw the blasting material on to the respective surfaces with the smallest possible scatter, as by a nearly parallel jet. This may be attained through the use of the Laval-like formation of the blast nozzle, as well as by a correspondingly suitable grain size of the blasting material. Through such a nozzle form, it also becomes possible to increase the velocity of the blasting material, which is the same as an increase of the effectiveness thereof, without, however, attacking the passivation layer of the base material.

It is of course understood that, in the example here illustrated, after the decontamination of the one chamber, the other chamber, which is separated therefrom through a partition 32, is treated through a second manhole 33. After carrying out the flushing steps mentioned above, the chambers may be entered and the work of sealing the defective pipes 34 may then take place. After a concluding pressure test of the steam generator thus repaired, the generator may again be connected to the reactor circulatory system so that the time periods for the repair work practically become the equivalent of the at-rest periods of the power plant. Waiting for the decay of the radioactivity, therefore, becomes unnecessary.

Obviously, similar working operations may be applied to other reactor components, such as pipe conduits, pumps, etc. This method, of course, is also suitable for the normal cleaning operations on non-contaminated surfaces, and is therefore not limited to components of nuclear reactor installations.

Although the invention is illustrated and described herein as a method for decontamination of surfaces of nuclear reactor components, it is nevertheless not intended to be limited to the details shown, since various modifications and structural changes may be made therein without departing from the spirit of the invention and within the scope and range of equivalents of the claims.

We claim:

1. In a process for cleaning of components of nuclear reactor power plants which have been wetted during the operation with $H_2O$ or $D_2O$, particularly for the decontamination of radio-actively contaminated regions by mechanically abrading the surfaces to be cleaned down to the passivation layer of the base material by means of boron trioxide particles with the aid of compressed gas, the improvement which comprises admixing water with the abraded solid particles and boron trioxide particles to dissolve the boron trioxide particles, and filtering the boron trioxide aqueous solution containing abraded solid particles to separate and recover the abraded solid particles and the boron trioxide solution.

2. Process in accordance with claim 1 wherein water is admixed with a mixture of abraded solid particles and boron trioxide particles suspended in said gas during cleaning and separated from the gas.

3. Process in accordance with claim 2 wherein a portion of said gas is admixed with said water and said mixture of abraded solid particles and boron trioxide particles to agitate the mixture and facilitate solution of the boron trioxide in the water.

4. Process in accordance with claim 1 wherein water is added to the atmosphere around the area of decontamination to precipitate abraded solid particles and boron trioxide.

5. Process in accordance with claim 1 wherein water is added to flush boron trioxide particles from the decontamination region.

6. Process in accordance with claim 1 including treating the aqueous solution of boron trioxide to recover solid particles of boron trioxide.

7. Process in accordance with claim 1 wherein the filtering operation is selected from the group consisting of magnetic, mechanical and ion-exchanger.

* * * * *